US012432301B1

(12) United States Patent
Bernabe et al.

(10) Patent No.: US 12,432,301 B1
(45) Date of Patent: Sep. 30, 2025

(54) DISCONNECTED CONTACT CENTER REQUEST MANAGEMENT

(71) Applicant: Zoom Communications, Inc., San Jose, CA (US)

(72) Inventors: William Thomas Bernabe, Northborough, MA (US); Kristin Renae Bosch, Denver, CO (US); Benjamin Joseph DeStephen, Hilliard, OH (US)

(73) Assignee: Zoom Communications, Inc., San Jose, CA (US)

( * ) Notice: Subject to any disclaimer, the term of this patent is extended or adjusted under 35 U.S.C. 154(b) by 191 days.

(21) Appl. No.: 18/351,193

(22) Filed: Jul. 12, 2023

(51) Int. Cl.
*H04M 3/00* (2024.01)
*G10L 15/08* (2006.01)
*H04M 3/51* (2006.01)
*H04M 3/523* (2006.01)

(52) U.S. Cl.
CPC ........... *H04M 3/5231* (2013.01); *G10L 15/08* (2013.01); *H04M 3/5175* (2013.01); *G10L 2015/088* (2013.01); *H04M 2201/40* (2013.01)

(58) Field of Classification Search
CPC ............ H04M 3/5231; H04M 3/5175; H04M 2201/40; G10L 15/08; G10L 2015/088
USPC ....... 379/265.01–265.14, 266.01–266.1, 309
See application file for complete search history.

(56) References Cited

U.S. PATENT DOCUMENTS

| 6,724,885 | B1 * | 4/2004 | Deutsch | ................ | H04M 3/523 |
| | | | | | 379/88.2 |
| 7,228,145 | B2 * | 6/2007 | Burritt | ................... | H04W 4/24 |
| | | | | | 455/445 |
| 7,813,493 | B2 | 10/2010 | Shaffer et al. | | |
| 8,582,750 | B2 * | 11/2013 | Lee | ......................... | H04M 3/12 |
| | | | | | 709/227 |
| 8,718,262 | B2 | 5/2014 | Conway et al. | | |
| 8,855,292 | B1 * | 10/2014 | Brunson | ............... | H04M 3/523 |
| | | | | | 379/266.03 |
| 9,295,087 | B2 * | 3/2016 | Chitre | ................... | H04W 76/50 |
| 10,194,028 | B2 | 1/2019 | Vymenets et al. | | |
| 10,412,219 | B2 | 9/2019 | Chang et al. | | |
| 2002/0090947 | A1 * | 7/2002 | Brooks | ................. | H04W 76/19 |
| | | | | | 455/450 |

(Continued)

OTHER PUBLICATIONS

Microsoft Learn. Configure reconnection to a previous chat session. https://learn.microsoft.com/en-us/dynamics365/customer-service/configure-reconnect-chat?tabs=customerserviceadmincenter. Jan. 22, 2023. 4 pages.

*Primary Examiner* — William J Deane, Jr.
(74) *Attorney, Agent, or Firm* — Young Basile Hanlon & MacFarlane, P.C.

(57) ABSTRACT

A contact center request received from a user device is determined to be associated with a previous contact center engagement handled by an agent. The contact center request is determined to have been received within a threshold duration of a termination of the previous contact center engagement. The contact center request is identified as a reconnected contact center request in response to determining that the contact center request is received within the threshold duration. The user device is connected to an agent device associated with the agent in response to determining that the reconnected contact center request is received within a wrap-up time associated with the previous contact center engagement.

20 Claims, 10 Drawing Sheets

(56) References Cited

U.S. PATENT DOCUMENTS

| | | | |
|---|---|---|---|
| 2012/0027194 A1* | 2/2012 | Deshpande | H04M 3/493 379/265.01 |
| 2017/0118345 A1 | 4/2017 | Tolksdorf | |
| 2023/0179701 A1* | 6/2023 | Mendiratta | H04M 3/085 379/1.01 |

* cited by examiner a
DISCONNECTED CONTACT CENTER REQUEST MANAGEMENT

FIELD

This disclosure generally relates to contact centers, and, more specifically, to the handling of abnormally disconnected contact center requests.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
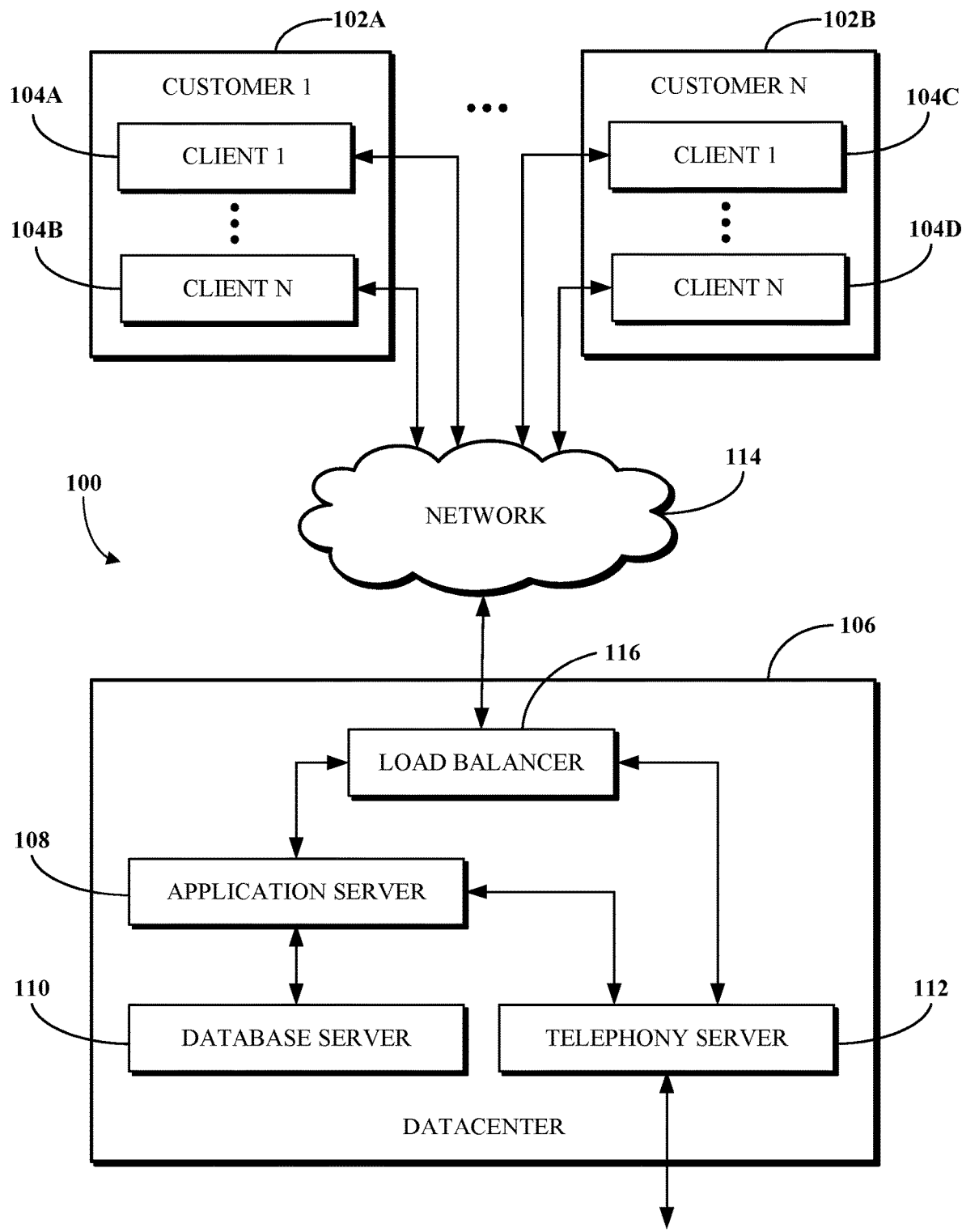
FIG. 1 is a block diagram of an example of an electronic computing and communications system.

A contact center may be implemented by an operator of a software platform, such as a unified communications as a service (UCaaS) platform. The contact center facilitates connections and interactions between users and agents. Via a user device, a user may initiate a request for a contact center engagement (i.e., "a contact center request"). The received contact center request may be placed in a queue associated with one or more (e.g., a group of) agents. Traditionally, queued contact center requests may be served (e.g., handled) on a first-in-first-out (FIFO) basis.

That a contact center request is served includes that the contact center request is routed to an agent so that the user can communicate with the agent. Said another way, that a contact center request is served includes that the user device is connected to an agent device of the agent who is to handle the contact center request. A contact center request that has been routed to an agent such that the agent is communicating with the user is referred to herein as "an engagement." That is, an engagement is an interaction between the user and a selected agent to address the purpose of the contact center request.

In some situations, the user device may abnormally (e.g., abruptly) disconnect from the contact center while the user is communicating with an agent or while the user is waiting in a queue to be connected to an agent. To illustrate, a user waiting on hold for 60 minutes is finally connected to an agent of the contact center. Twenty seconds into the call, the cell phone battery of the user depletes; or while on hold for 45 minutes, the user, intending to press the mute button on their phone, presses the hang up button. In either situation, the user initiates another contact center request (e.g., calls back) within a short duration of time and is traditionally, again, placed in the long queue (e.g., may have to wait another 60 minutes anew).

In such situations, the user may initiate a follow-up (e.g., subsequent) contact center request. For improved user satisfaction, it would be desirable to have the user serviced as soon as possible without having to be placed in a queue according to the time that the subsequent contact center request is received. It would also be desirable to reconnect the user with the agent (if any) who was handling the abnormally terminated engagement.

However, conventional contact centers lack to technical capabilities to identify that a new contact center request is associated with a previous contact center request or a previous engagement and thus cannot distinguish between an incoming contact center request that is a new contact center request (i.e., a first attempt by the user to connect with the contact center) and an incoming contact center request that continues a previous contact center request (e.g., due to an abrupt or otherwise abnormal disconnection of the previous contact center request). As such, conventional contact centers may simply place any incoming contact center requests in queues according to the time/order that the contact centers receive the contact center requests.

Implementations of this disclosure address problems such as these by identifying that an incoming contact center request is associated with a previous contact center request or a previous engagement. If the incoming request is received within a threshold time of the previous contact center request or engagement, the incoming contact center request is classified as a reconnected request. In an implementation, a contact center request received from a user device is determined to be associated with a previous contact center engagement handled by an agent. The contact center request is determined to have been received within a threshold duration of a termination of the previous contact center engagement. The contact center request is identified as a reconnected contact center request in response to determining that the contact center request is received within the threshold duration. The user device is connected to an agent device associated with the agent in response to determining that the reconnected contact center request is received within the wrap-up time.

To describe some implementations in greater detail, reference is first made to examples of hardware and software structures used to implement a system for disconnected contact center request management. FIG. 1 is a block diagram of an example of an electronic computing and communications system 100, which can be or include a distributed computing system (e.g., a client-server computing system), a cloud computing system, a clustered computing system, or the like.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
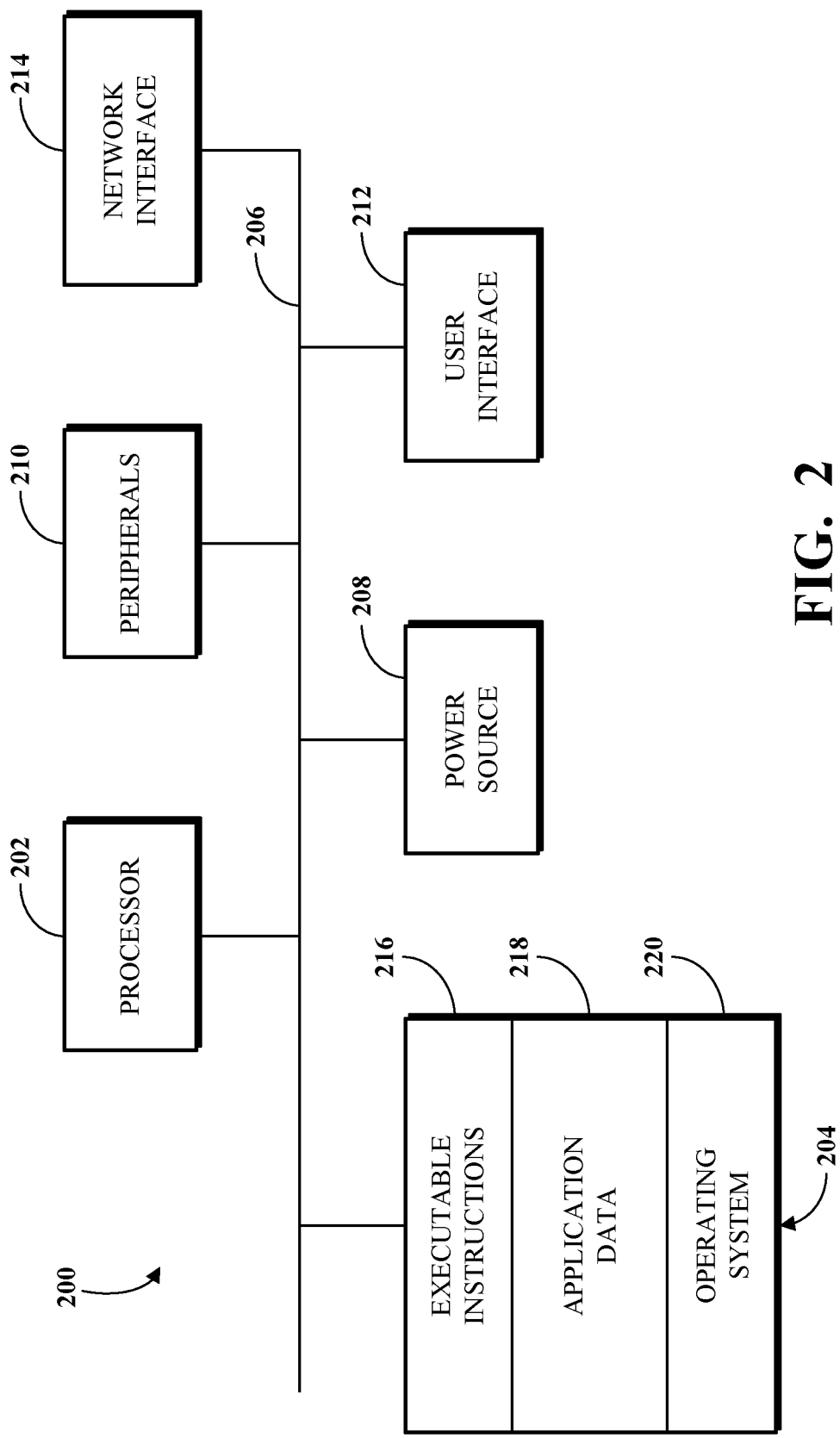
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
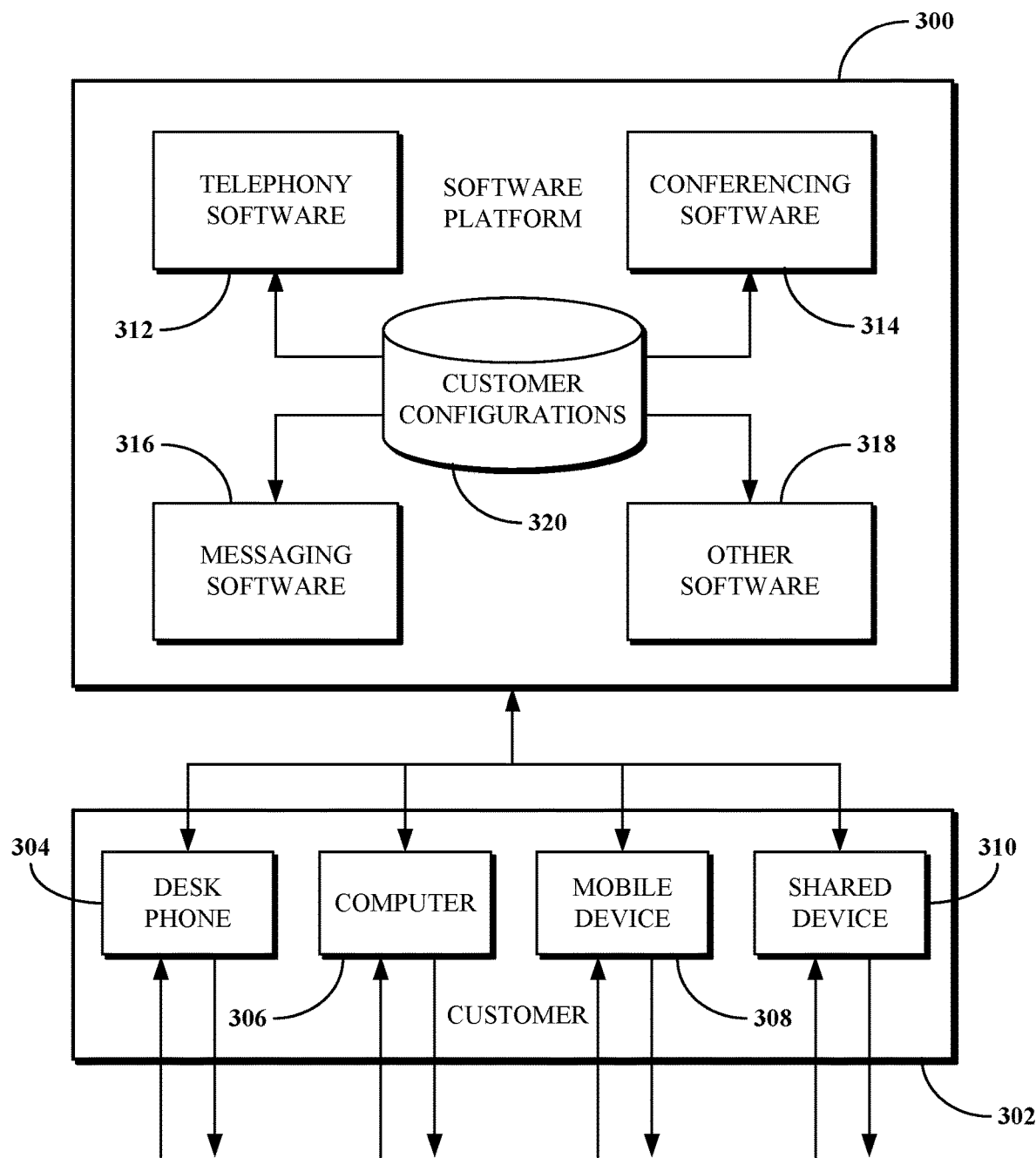
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a reconnection software for identifying and routing reconnected contact center requests.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
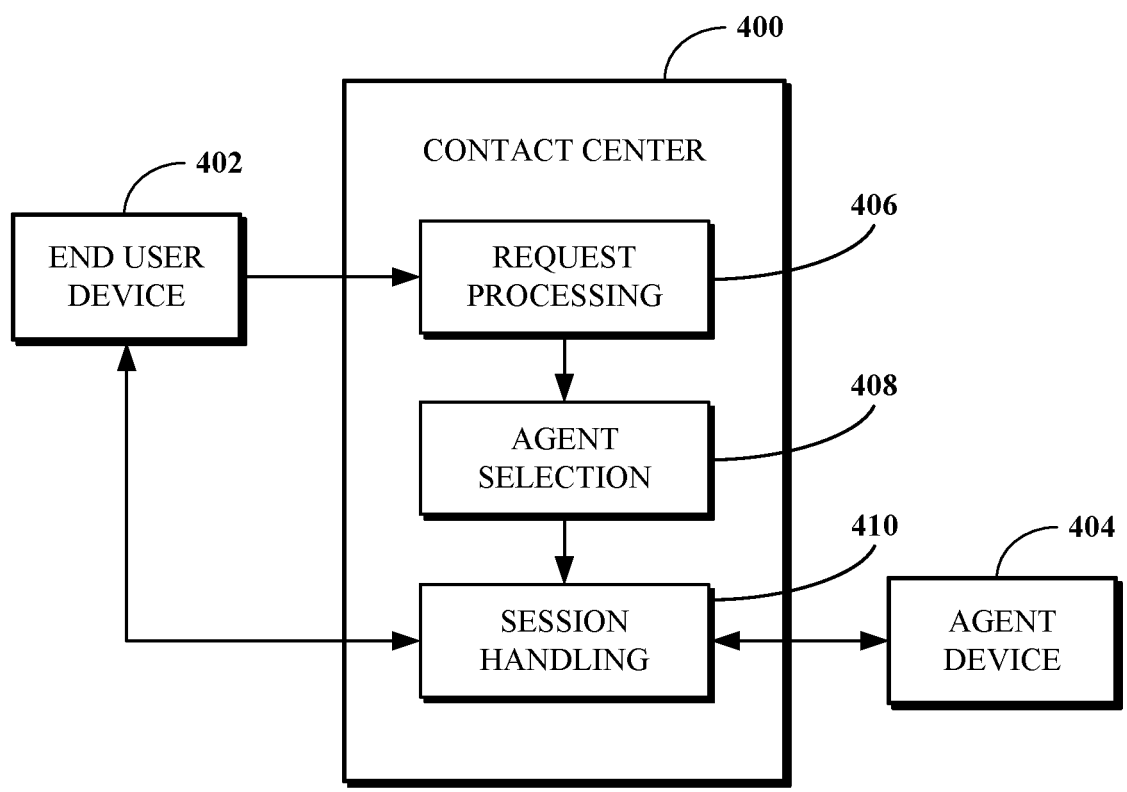
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group (which may also be referred to as, or may be associated with, a queue) associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, text, and social media modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection for a session between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software. The session handling software 410 may facilitate a contact center engagement including by determining a sentiment-based score for the engagement and alerting a contact center operator, such as an agent or supervisor, regarding the sentiment-based score or a prioritization thereof based on the score meeting or exceeding a threshold.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
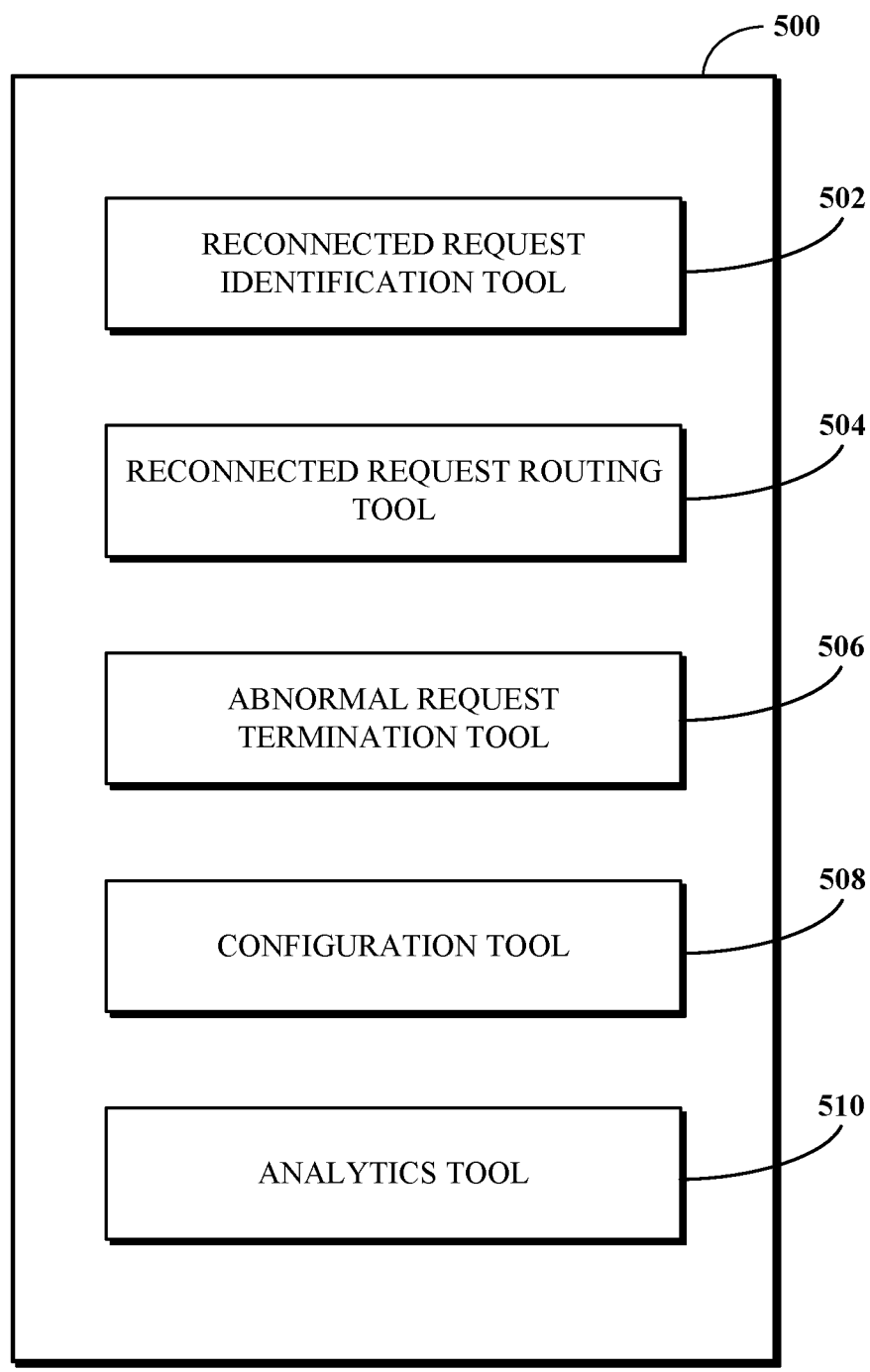
FIG. 5 is a block diagram of example functionality of a reconnection software.

FIG. 5 is a block diagram of example functionality of a reconnection software 500, which may be implemented by a contact center, such as the contact center 400 of FIG. 4. The reconnection software 500 includes tools, such as programs, subprograms, functions, routines, subroutines, operations, executable instructions, and/or the like for, inter alia and as further described below, disconnected contact center request management, such as for identifying that a contact center request is a reconnected contact center request (for brevity, a "reconnected request") associated with a previous contact center request (for brevity, "previous request") or with a previous engagement and determining a queueing disposition (queue placement) for the contact center request.

At least some of the tools of the reconnection software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the reconnection software 500 includes a reconnected request identification tool 502, a reconnected request routing tool 504, an abnormal request termination tool 506, a configuration tool 508, and an analytics tool 510. In some implementations, the reconnection software 500 can include more or fewer tools. In some implementations, some of the tools may be combined, some of the tools may be split into more tools, or a combination thereof. In some implementations, some of the tools may be included in other software of the contact center. For example, the request identification tool 502 may be included in or implemented by the request processing software 406 of FIG. 4; the reconnected request routing tool 504 may be included in or implemented by the agent selection software 408; and the abnormal request termination tool 506 may be included in or implemented by the session handling software 410 of FIG. 4.

The reconnected request identification tool 502 determines whether a new, incoming contact center request (for brevity, "incoming request") is to be identified (e.g., classified or handled) as a reconnected request. By identifying an incoming request as a reconnected request, the reconnection software 500 prioritizes the incoming request for handling, as further described herein. An example of the operations of the reconnected request identification tool 502 are further described with respect to FIG. 6.

The reconnected request identification tool 502 determines whether the contact center request is received within a threshold duration of a termination of the previous request or a previous engagement. If the previous request is related to a previous request or engagement and is received within the threshold duration, then the reconnected request identification tool 502 determines that the contact center request is a reconnected request. In an example, whether the previous request was prematurely terminated or not, if the contact center request is received within the threshold duration, then the contact center request is identified as a reconnected request.

The reconnected request identification tool 502 determines whether an incoming request is related to a previous request or engagement. The previous request or engagement may have been prematurely (e.g., abnormally, abruptly, or unintentionally) terminated. There can be many reasons for the premature termination, including temporary network outages on the user device (e.g., the user device 402 of FIG. 4) or the agent device (e.g., the agent device 404 of FIG. 4), an unexpected reboot of the user device, the cell phone battery of the user running out, the user accidentally pressing an incorrect button or control, or an improper handoff between cellular towers for a user on the move, among other reasons. For brevity, that an incoming request is related to a previous request includes that the incoming request is related to a previous engagement resulting from the previous request. That is, the previous request may have progressed into an engagement. As such, the incoming request may relate to a previous request that prematurely terminated while the previous request was queued awaiting an agent; or the incoming request may relate to an engagement that prematurely terminated while the user is communicating with an agent (e.g., while the user device is connected to the agent device).

The reconnected request identification tool 502 can determine that an incoming request is related to a previous request in any number of ways. For example, a data store may include data related to contact center requests and engagements. The reconnected request identification tool 502 can use data associated with previous requests in the data store to identify a related previous request.

A related previous request can be a most recent previous request that is received from a same source as the incoming request. A related previous request can be a most recent previous request that is associated to the same user as the incoming request. The incoming request and the previous request need not have the modalities. To illustrate, a previous request may be a request for a video communication session that a user initiated using their desktop computer. However, after waiting for 30 minutes for an agent, the user needed to leave their home. The user disconnected the desktop session and initiated a new contact center request using their cellular phone.

The data store may include data identifying a source of a contact center request. The source may be a telephone number, an IP address, a Media Access Control (MAC) address, an identifier of the user who initiated the contact center request. In another example, a user making (e.g., issuing) a contact center request may first be required to provide authentication information (e.g., a username and a password). As such, the source of a contact center request can an identifier of the user themselves. In yet another example, the user may have been provided with a reference number during the previous request and/or engagement. In the process of establishing the incoming request, the user may be able to provide the reference number. To illustrate, during the previous engagement, the agent may have provided the user with the reference number 124AB5. During initiation of the incoming request, the user provides the reference 124AB5 via an IVR system. The previous engagement (or the previous request resulting in the previous engagement) can be identified based on the reference number.

In some situations, several callers may be linked to the same phone number. This may be common in corporate environments where each staff member may have a unique extension, but outgoing calls appear to originate from the same caller ID, which may typically be the company's main number. As such, to distinguish one caller from another, the reconnection software 500 may obtain or use additional information (e.g., in addition to the caller ID) to identify the source of a contact center request. Such additional information may include one or more of an IP address, a MAC address, or data obtained from the caller.

The reconnected request routing tool 504 determines a routing for a reconnected request and/or handling of a reconnected request. The reconnected request routing tool 504 prioritizes a reconnected request for handling so as to minimize the wait time for the user therewith improving the user experience. The reconnected request routing tool 504 determines a routing for the reconnect request based on whether the previous request abnormally terminated when the user was waiting or was communicating with an agent. The reconnected request routing tool 504 may determine the routing of the request based on data obtained from the analytics tool 510. An example of the operations of the reconnected request routing tool 504 are further described with respect to FIG. 7.

The abnormal request termination tool 506 identifies a contact center request as having been abnormally terminated. As mentioned above, identifying a contact center request as having abnormally terminated can include identifying that an engagement resulting from the contact center request was abnormally terminated. In an example, the abnormal request termination tool 506 receives an indication from an agent in communication with a user that the communication session with the user abnormally terminated. The agent can provide the indication via a user interface, as described with respect to FIG. 9. In an example, and with respect to contact center requests over the audio (e.g., telephone) modality, the abnormal request termination tool 506 may identify, using SIP codes, that a call was abnormally terminated. For example, the abnormal request termination tool 506 may obtain status codes (i.e., SIP codes) associated with contact center requests from the telephony server 112.

The configuration tool 508 can be used to configure rules or settings for recognizing and/or for handling (e.g., routing)

reconnected requests. As already mentioned above, threshold wait times may be associated with (e.g., configured for) different queues.

The configuration tool 508 can be used to configure rules related to times. The wrap-up time associated with a queue can be configured to be extended, for an abnormally terminated engagement, by a certain amount of time (e.g., 150% of the queue wrap-up time) in response to determining that the engagement was abnormally terminated. As such, in an example, if an agent is still within the wrap-up time period associated with a previous engagement when a reconnected request is received, then the reconnected request routing tool 504 immediately transfers the reconnected request to the agent. In an example, the reconnected request routing tool 504 may immediately connect the end user device to the agent device. In an example, the wrap-up time may be configured such that it cannot be interrupted in the case that a reconnected request is received.

Wrap-up time refers to the amount of time an agent spends after completing a user interaction (i.e., an engagement) before the agent is considered available to handle another contact center request. Wrap-up time can be used to ensure that the agent has sufficient time to document the interaction with the user, review notes, and/or complete any other tasks related to the engagement. Wrap-up time can also be used to ensure that the agent is prepared to handle an interaction with a next user. Additionally, the wrap-up time can be configured to be different for different types of user interactions. For example, the wrap-up time for a user interaction involving a complex issue may be longer than the wrap-up time for a user interaction involving a simple issue. Furthermore, the wrap-up time can be configured to be different for different queues (e.g., groups of agents). For example, the wrap-up time for a customer service queue may be longer than the wrap-up time for a sales-related queue.

The analytics tool 510 can be used to identify a current estimated wait time for a queue and/or for an agent. A current estimated wait time is the length of time that a user (i.e., an incoming request) is expected to wait before being connected to an agent. The estimated wait time can be based on the number of users in the queue, the number of agents available to handle requests, and the average time required for an agent to handle a request.

The analytics tool 510 can also be used to identify an average engagement time for an agent, which is the average time it takes for the agent to handle (e.g., to dispose of) a contact center request. The average engagement time for an agent can be used by the reconnected request routing tool 504. For example, when a reconnected request is received, the current estimated wait time (e.g., 10 minutes) for a queue may be less than the average engagement time (e.g., 15 minutes) for the agent to whom the reconnected request should be routed and who is currently not idle. As such, in an example, and as further described herein, the reconnected request routing tool 504 can prompt the user whether they prefer to wait for the agent or be routed to another agent.

Additionally, the analytics tool 510 can be used to identify, within a time period provided as input, a first number of engagements marked by an agent as being abnormally terminated and a second number of reconnected requests resulting from (or received for) those abnormally terminated engagements. The reconnection software 500 may periodically identify such analytics (e.g., generate automated reports) or may identify such analytics on demand (e.g., in response to a request initiated by an authorized user). If a the difference between the first number and the second number exceed a threshold, the analytics tool 510 may transmit a notification of such a discrepancy to authorized personnel (e.g., a manager). The threshold may be based on an average difference for a group of agents. To illustrate, within a one-week period, an agent may have marked 50 engagements as being abnormally disconnected but only 5 reconnected requests were identified based on those 50 engagements, which is a ratio (e.g., rate) of 10% of reconnected requests. On other hand, the average ratio for a group of agents that includes the agent may be 70%.

The analytics tool 510 can also maintain and report on other data related to reconnected requests. For example, the analytics tool 510 can keep track of a number of times that users indicated that they prefer to be routed to different agents than the previous agents and the number of times that users indicated that they prefer to be routed to the previous agents. The analytics tool 510 can also maintain and report on times within which the reconnected requests were received.

To further describe some implementations in greater detail, reference is next made to examples of techniques which may be performed by or using a system for disconnected contact center request management.

Figure 6:
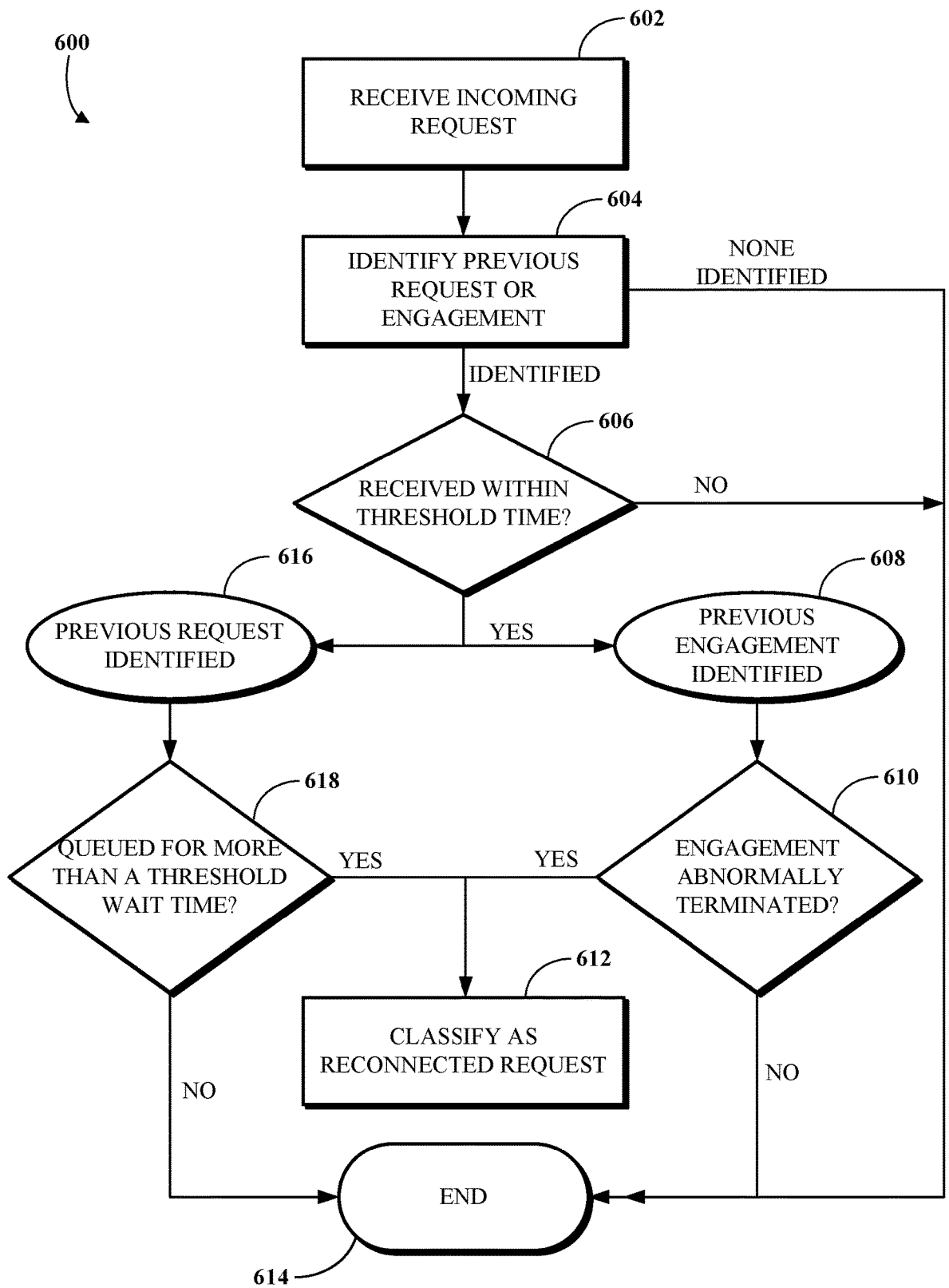
FIG. 6 is a flowchart of an example of a technique for determining whether an incoming contact center request is to be classified as a reconnected request.

FIG. 6 is a flowchart of an example of a technique 600 for determining whether an incoming contact center request is to be classified as a reconnected request. The technique 600 can be executed using computing devices, such as the systems, hardware, and software described herein. The technique 600 can be implemented by a reconnected request identification tool, such as the reconnected request identification tool 502 of FIG. 5. The technique 600 can be performed, for example, by executing a machine-readable program or other computer-executable instructions, such as routines, instructions, programs, or other code. The steps, or operations, of the technique 600, or another technique, method, process, or algorithm described in connection with the implementations disclosed herein can be implemented directly in hardware, firmware, software executed by hardware, circuitry, or a combination thereof.

At 602, an incoming request is received, such as by the contact center 400 of FIG. 4 of the reconnection software 500 of FIG. 5. At 604, the reconnected request identification tool attempts to identify a previous request or a previous engagement related to the incoming request, as described above. The previous request may be identified based on a source of the incoming request and/or additional information obtained from the user who initiated the incoming request. If a previous request or engagement is identified, the technique 600 proceeds to 606; otherwise, the technique proceeds to 614 and the technique 600 terminates.

In an example (not specifically shown), if a number of identified previous engagements related to the incoming request exceeds a reconnect threshold (e.g., 3), then the incoming request is not considered to be a reconnected request. To illustrate, a malicious user repeatedly calls back, is connected to an agent, and then hangs up on the agent. To limit this scenario, and to give the user the benefit of the doubt, the user is allowed, only for a limited (e.g., the reconnect threshold) number of times, to be immediately connected to the agent and avoid having to wait in the queue.

At 606, it is determined whether the incoming request was received within a threshold duration of a termination of the previous request or engagement. If the incoming request was not received within the threshold duration of the termination of the previous request, then the technique 600 proceeds to 614; otherwise, the technique 600 proceeds to either a branch 608 or a branch 616. If an engagement is identified at 604, then the technique 600 proceeds from 606 to the branch 608. If a previous request but not a previous engagement were identified at 606, then the technique 600 proceeds to the branch 616.

At 610, in the 608 branch, the technique 600 determines whether the previous engagement was abnormally terminated. The determination that the engagement was abnormally terminated can be made based on data associated with the engagement in a data store. In an example, the engagement may be marked as having been abnormally terminated by the agent handling the engagement. If the engagement is marked as abnormally terminated, then the incoming request is classified as a reconnected request, at 612. If the engagement is not determined to have abnormally terminated, then the incoming request is not classified as a reconnected request, and the technique 600 terminates at 614. The classification of an incoming as a reconnected request can be used by the reconnected request routing tool 504, such as described with respect to FIG. 7.

At 618 of the branch 616, it is determined whether the previous request was queued for more than threshold wait time. If the previous request was queued for more than the threshold wait time, then the incoming request is classified as a reconnected request, at 612; otherwise, the incoming request is not classified as a reconnected request and the technique 600 terminates at 614.

In a variant of the technique 600, a determination as to whether an incoming contact center request is made only with respect to incoming requests for which a previous engagement can be identified. That is, at 604, only a previous engagement (but not a previous request that did not evolve into an engagement) is identified. As such, in this variant, the technique 600 includes the branch 608 and does not include the branch 616.

Figure 7:
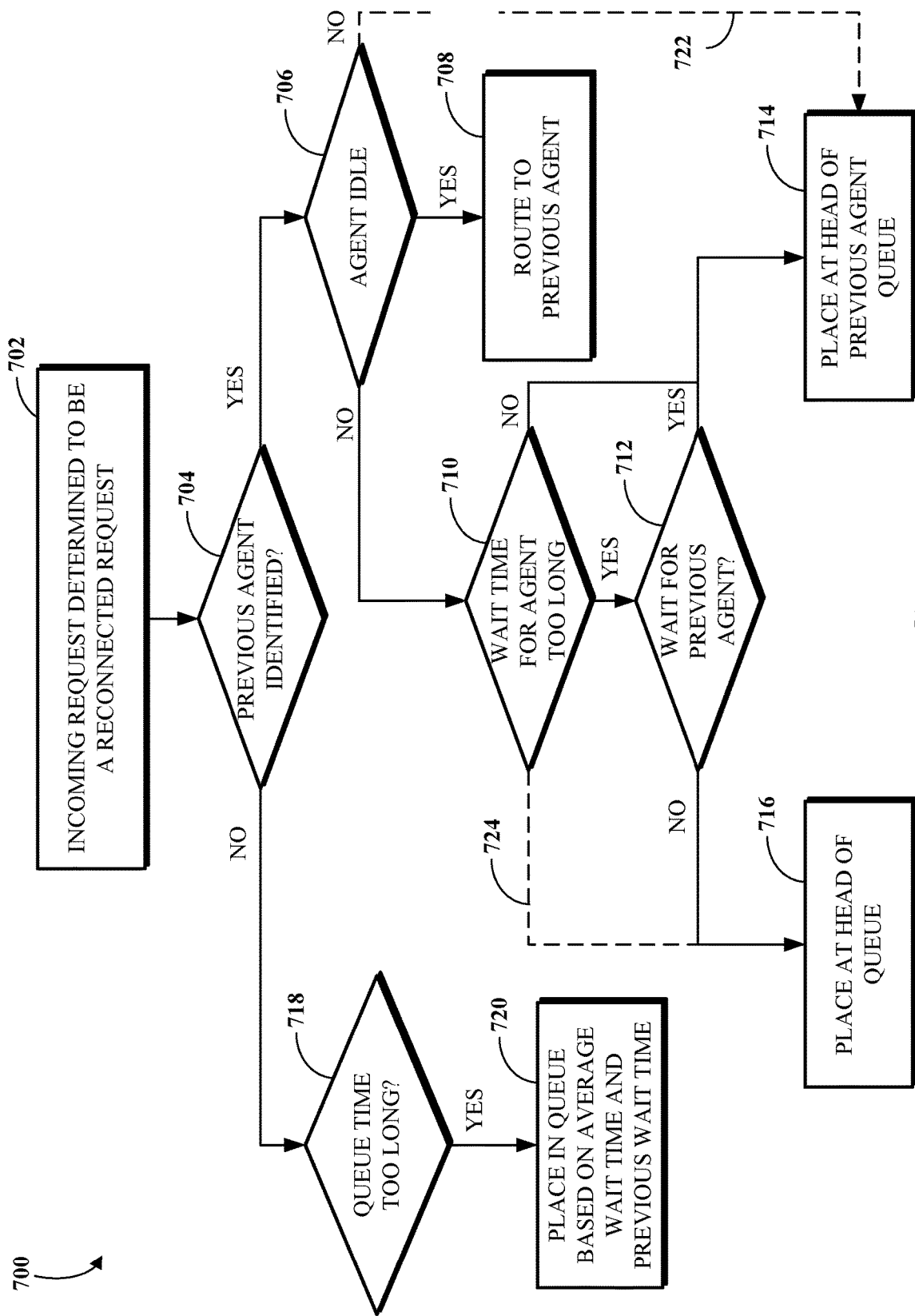
FIG. 7 is a flowchart of an example of a technique for routing a reconnected contact center request.

FIG. 7 is a flowchart of an example of a technique 700 for routing a reconnected contact center request. The technique 700 can be executed using computing devices, such as the systems, hardware, and software described herein. The technique 700 can be implemented by the reconnected request routing tool 504 of FIG. 5. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof.

The technique 700 is initiated, at 702, in response to a determination that an incoming request is a reconnected request. The determination may be made as described with respect to or by the technique 600 of FIG. 6. At 704, it is determined whether an agent is associated with the previous request. That is, at 704, it is determined whether the previous request abnormally terminated while the user was waiting or while the user was communicating with an agent. If the previous request evolved into an engagement, then the agent that was handling the engagement is identified. If an agent (referred to as a "previous agent") is identified at 704, the technique 700 proceeds to 706; otherwise, the technique 700 proceeds to 718.

At 706, the technique 700 determines whether the identified agent is idle. The identified agent can be determined to be idle if the agent is not currently in an engagement with another user. The identified agent can be determined to be idle if the wrap-up time associated with the previous engagement has not lapsed. In an example, the identified agent can be determined to be idle if the wrap-up time associated with the previous engagement has not lapsed and a configuration indicates that the wrap-up time can be interrupted (i.e., that a reconnected request can be immediately routed to the agent during the wrap-up of the previous engagement). If the agent is determined to be idle, the technique 700 proceeds to 708; otherwise, the technique 700 proceeds to 710. At 708, the incoming request is routed to the agent.

At 710, the technique 700 determines whether the wait time for the agent is considered to be too long. As the agent is determined not be idle, then the agent may be in another engagement. The determination whether the wait time for the agent is too long can be made by comparing the average engagement time (denoted AET) of the agent to the current average wait time (denoted CWT) in the queue to which the reconnected request would be added, if the incoming request were the only request in queue (i.e., were the incoming request to be inserted at the head of the queue). In an example, if $AET > c \times CWT$, where $c \geq 1$ (e.g., $c=1.3$), then the wait time for the agent is considered to be too long.

If the wait time is not considered to be too long, the technique 700 proceeds to 714 to place the reconnected request at the head of the queue of the previous agent. If the wait time is too long, the technique 70 proceeds to 712. The user may be prompted (not shown) whether they would prefer to wait for the previous agent or be routed to another agent (e.g., any next available agent). The prompt may include at least one of the average engagement time and the current average wait time. the At 712, the input received from the user is evaluated. If the user indicates that they prefer to wait for the previous agent, then the technique 700 proceeds to 714; otherwise, the technique 700 proceeds to 716 to place the incoming request at the head of the queue (i.e., as the next request to be handled by an available agent).

In a variant of the technique 700, if the agent is determined not be idle, at 706, then the technique 700 proceeds to 714 to place the incoming call at the head of the queue of the previous agent, as indicated by an arrow 722. In a variant of the technique 700, if the wait time is determined to be too long, at 710, then the user is not prompted, as described above; rather the technique 700 proceeds from 716 to 724, as indicated by an arrow 724.

At 718, the technique 700 determines whether the user was waiting for a long time for an agent. The previous request may have abnormally terminated while the user was waiting in a queue and the user had waited for longer than a threshold wait time (e.g., 15 or 30 minutes). The threshold wait time may be configured, per queue, via the configuration tool 508 of FIG. 5. In an example, the threshold wait time can be dynamically set based on a current average wait time. To illustrate, the threshold wait time may be set to a fraction (e.g., 70%) of the current estimated wait time. The current estimated wait time may be obtained from the analytics tool 510.

If it is determined that the user was waiting for a long time, then the technique 700 proceeds to 720; otherwise (not shown), the reconnected request is handled as any other incoming (but not reconnected) request. At 720, the reconnected request may be placed in a queue at a position that compensates for (e.g., avoids) the time already spent waiting.

Figure 8:
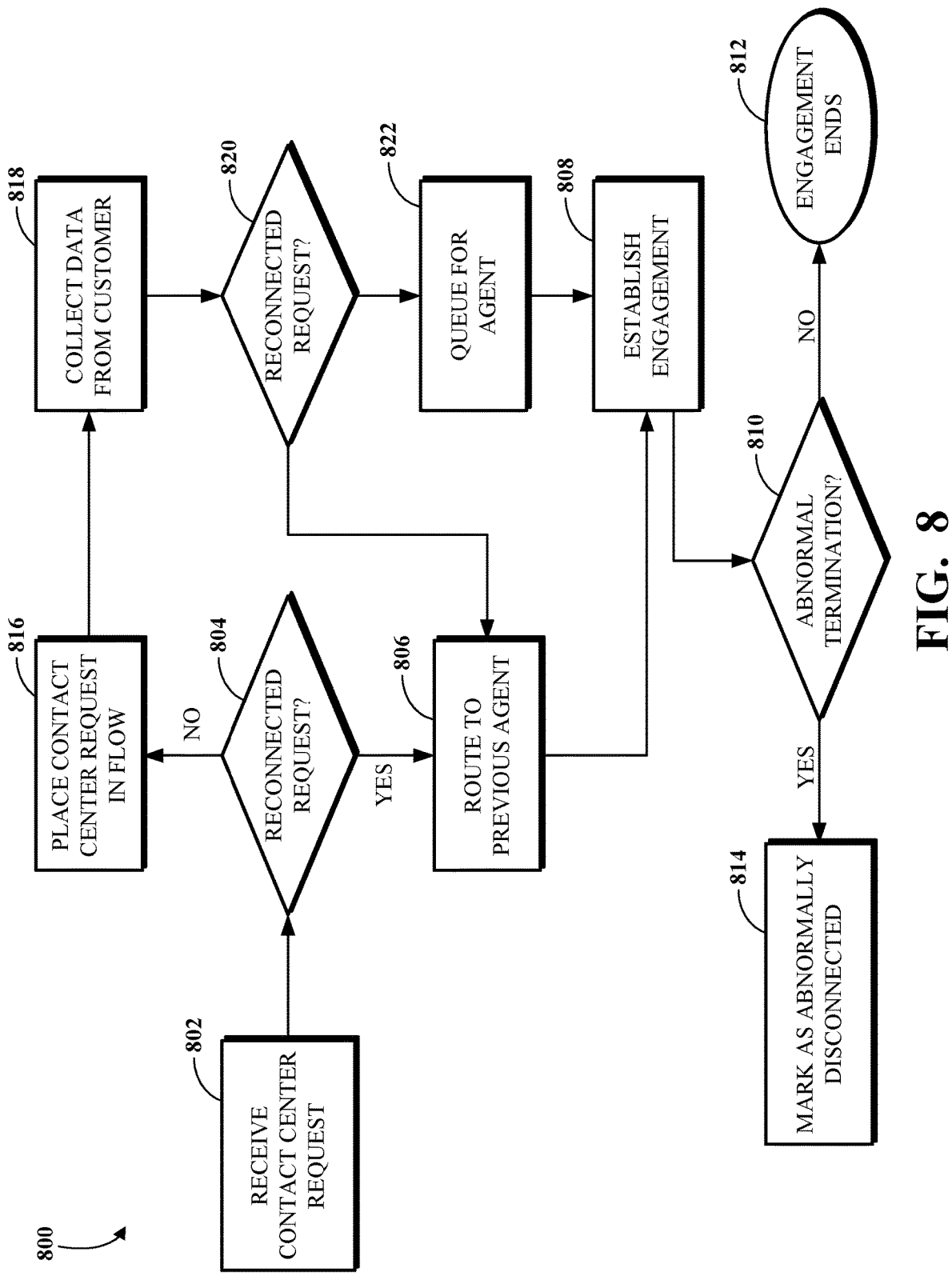
FIG. 8 is a flowchart of an example of a technique for reconnecting a contact center request to a previous agent.

FIG. 8 is a flowchart of an example of a technique 800 for reconnecting a contact center request to a previous agent. The technique 800 assumes that an incoming contact center request is associated with a previous engagement. The technique 800 can be executed using computing devices, such as the systems, hardware, and software described herein. The technique 800 can be implemented by a reconnection software, such as the reconnection software 500 of FIG. 5. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

At 802, a contact center request is received. The contact center request can be received by the contact center 400 of FIG. 4 or the reconnection software 500 of FIG. 5. At 804, the technique 800 determines whether the contact center request is a reconnected request. In an example, the determination whether the contact center request is a reconnected request can be as described with respect to the technique 600 of FIG. 6. The determination can be made only if there is a previous engagement associated with the contact center request, as described above with respect to the variant of the technique 600.

If the contact center request is determined to be a reconnected request, then the technique 800 proceeds to 806. At 806, the contact center request is routed to the previous agent (e.g., the agent that handled the previous engagement). Routing the contact center request to the previous agent can be as described with respect to the technique 700 of FIG. 7. In an example, the previous agent may be presented with information indicating that the contact center request is a reconnected request, such as described with respect to FIG. 10.

At 808, an engagement is set up between the user and the agent (e.g., the previous agent). That is, the user device is connected to the agent device so that the user and the agent can communicate. At 810, it is determined whether the engagement abnormally terminated. In an example, the agent may provide input indicating that the engagement abnormally terminated, such as described with respect to FIG. 9. If the engagement abnormally terminated, then the engagement and/or the contact center request are marked (such in a data store) as being abnormally terminated, at 814. Otherwise, the engagement ends at 812.

If the contact center request is not determined to be a reconnected request, then the technique 800 proceeds from 804 to 816 where the contact center request is processed by the contact center as any other normal (i.e., non-reconnected) incoming request. As described above, information associated with the request may be collected from the user, which can be used to identify an agent or an agent group to route the contact center request to. The information associated with the request can be used, at 820, to determine whether the contact center request is a reconnected request. That is, in some situations, it may be possible to identify that an incoming request is a reconnected request at 804. However, in some other situations it may not be possible to make such as a determination until 820 (i.e., until further input is received from the user, at 818). If the contact center request is determined to be a reconnected request, then the technique 800 proceeds to 806; otherwise, the contact center request is queued for an agent or an agent group, at 822. When an agent is available, the contact center request is routed (e.g., transferred) to the agent and an engagement is established at 808.

Figure 9:
FIG. 9 is an example of a user interface that can be displayed during a wrap-time of an engagement.

FIG. 9 is an example of a user interface 900 that can be displayed during a wrap-time of an engagement. The user interface 900 can be generated by a contact center, such as the contact center 400 of FIG. 4 or the reconnection software 500 of FIG. 5. The user interface 900 can be displayed at a device of an agent, such as the agent device 404 of FIG. 4. The user interface 900 can be displayed while an engagement is ongoing and/or after an engagement terminates. The user interface 900 enables the agent to provide notes regarding the engagement in a field 902. A wrap-up timer 904 indicates that the agent has 3 seconds of wrap-up time remaining. By checking a checkbox 906, the agent can indicate that the engagement abnormally terminated. In an example, and as described herein, in response to the checkbox 906 being checked, the wrap-time associated with the engagement may be extended (not shown).

Figure 10:
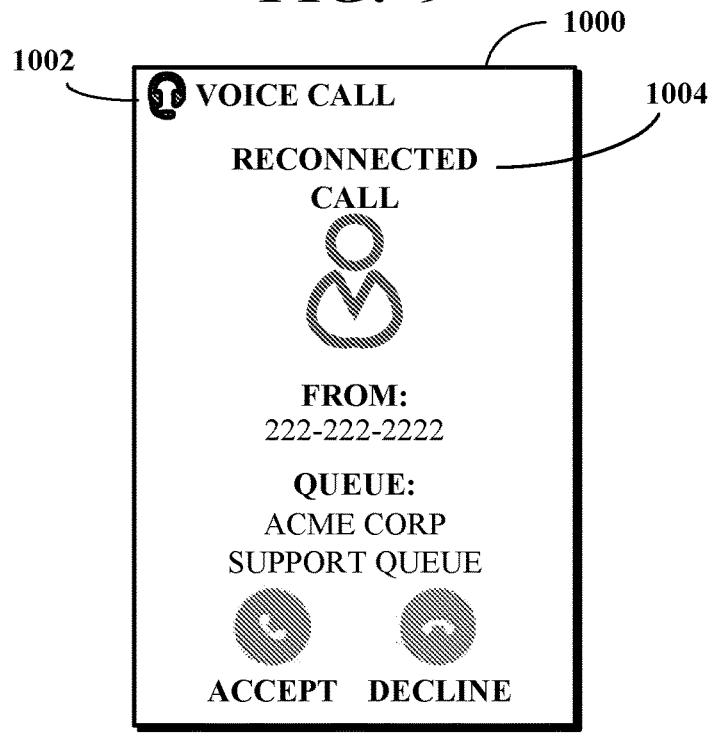
FIG. 10 is an example of a user interface of a reconnected contact center request.

FIG. 10 is an example of a user interface 1000 of a reconnected contact center request. The user interface 900 can be generated by a contact center, such as the contact center 400 of FIG. 4 or the reconnection software 500 of FIG. 5. The user interface 900 can be displayed at a device of an agent, such as the agent device 404 of FIG. 4. The user interface 1000 may be displayed at the agent device in response to determining that the agent is available to receive a contact center request. A modality indicator 1002 indicates that the contact center request is an audio request. An indicator 1004 indicates to the agent that the contact center request is a reconnected request.

Figure 11:
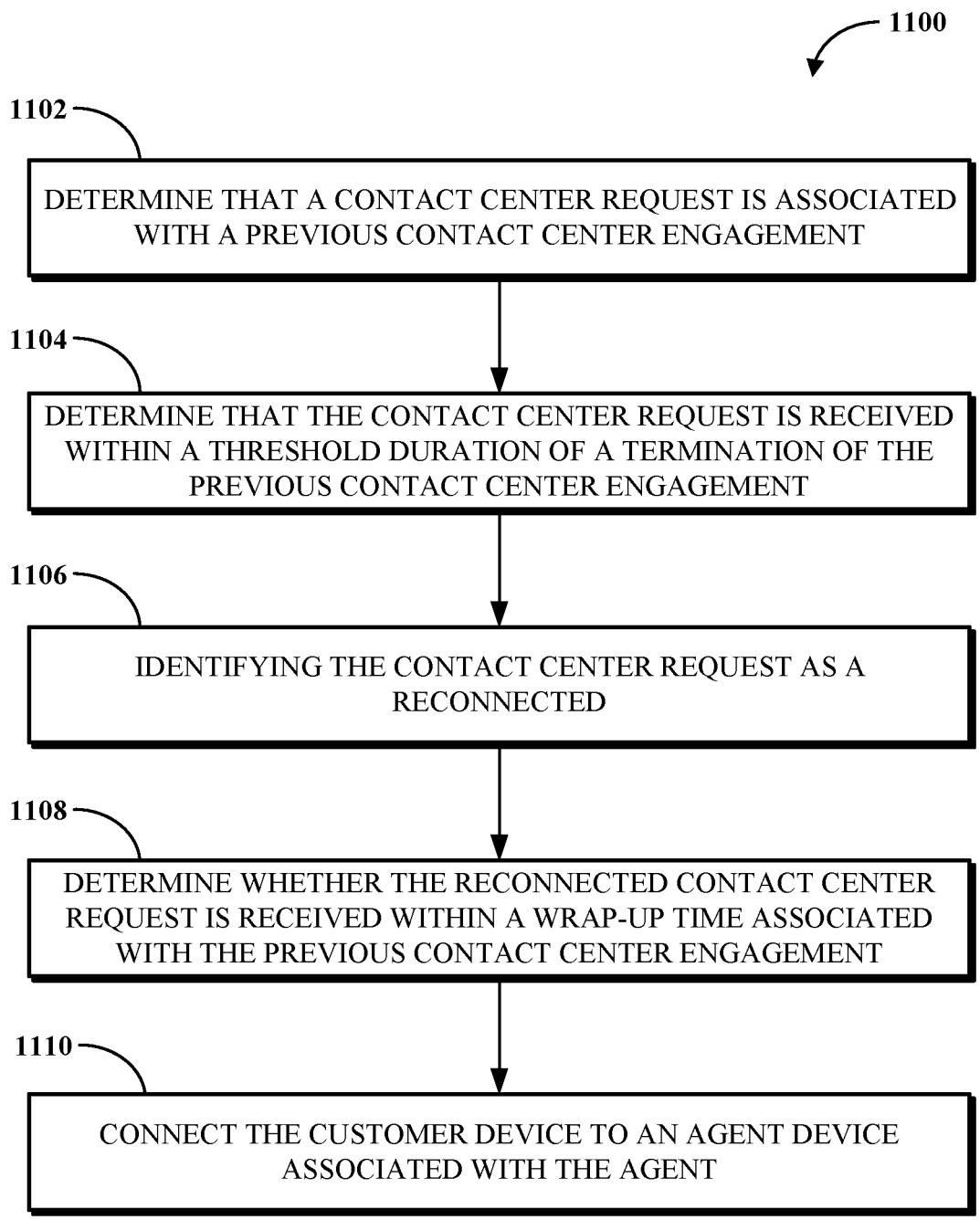
FIG. 11 is a flowchart of an example of a technique for routing an incoming contact center request related to a previous contact center request that was disconnected.

FIG. 11 is a flowchart of an example of a technique 1100 for routing an incoming contact center request related to a previous contact center request that was disconnected. The technique 1100 can be executed using computing devices, such as the systems, hardware, and software described with respect to FIGS. 1-10. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof. The technique 1100 may be initiated in response to receiving a contact center request from a user device.

At 1102, the technique 1100 determines that the contact center request is associated with a previous contact center engagement handled by an agent. In an example, determining that the contact center request is associated with the previous contact center engagement handled by the agent includes determining that the previous contact center engagement was abnormally terminated based on an input received from the agent indicating that the previous contact center engagement was abnormally terminated. In an example, determining that the contact center request is associated with the previous contact center engagement can include receiving an input from the user device indicating (e.g., can be used to determine) that the contact center request is associated with the previous contact center engagement.

At 1104, the technique 1100 determines that the contact center request is received within a threshold duration of a termination of the previous contact center engagement. At 1106, the technique 1100 identifies the contact center request as a reconnected contact center request in response to determining that the contact center request is received within the threshold duration. At 1108, the technique 1100 determines whether the reconnected contact center request is received within a wrap-up time associated with the previous contact center engagement. At 1110, the user device is connected to an agent device associated with the agent in response to determining that the reconnected contact center request is received within the wrap-up time. On the other hand, the reconnected contact center request is placed in a queue of the agent or a queue of another agent based on an average engagement time of the agent, in response to determining that the reconnected contact center request is not received within the wrap-up time.

In an example, the technique 1100 can further include, in response to determining that the agent is available, connecting the user device to the agent device. In an example, a wrap-time associated with the previous contact center engagement can be extended in response to determining that the previous contact center engagement was abnormally terminated. In an example, a difference between a first number of contact center requests marked by the agent as being abnormally terminated and a second number of contact center requests identified as reconnected contact center requests associated with a subset of the contact center requests can be identified. In an example, a notification of the difference can be transmitted, such as to an authorized agent.

For simplicity of explanation, the techniques 600, 700, 800, and 1100 of FIGS. 6, 7, 8, and 11, respectively, are each depicted and described herein as a series of steps or operations. However, the steps or operations of the techniques 600, 700, 800, and 1100 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes determining that the contact center request is received within a threshold duration of a termination of the previous contact center engagement; identifying the contact center request as a reconnected contact center request in response to determining that the contact center request is received within the threshold duration; determining whether the reconnected contact center request is received within a wrap-up time associated with the previous contact center engagement, and connecting the user device to an agent device associated with the agent in response to determining that the reconnected contact center request is received within the wrap-up time. Other embodiments of this aspect include corresponding computer systems, apparatus, and computer programs recorded on one or more computer storage devices, each configured to perform the actions of the methods.

Implementations may include one or more of the following features. The method where determining that the contact center request received from the user device is associated with the previous contact center engagement handled by the agent may include determining that the previous contact center engagement was inadvertently terminated based on an input from the agent. Determining that the contact center request received from the user device is associated with the previous contact center engagement handled by the agent may include receiving an input from the user device indicating that the contact center request is associated with the previous contact center engagement. The method may include determining whether the agent is available; and connecting the user device to the agent device in response to determining that the agent is available. The method may include determining that the previous contact center engagement was inadvertently terminated; and in response to determining that the previous contact center engagement was inadvertently terminated, extending the wrap-time associated with the previous contact center engagement. The method may include identifying a difference between a first number of contact center requests marked by the agent as being inadvertently terminated and a second number of contact center requests identified as reconnected contact center requests associated with a subset of the contact center requests. Implementations of the described techniques may include hardware, a method or process, or computer software on a computer-accessible medium.

One general aspect includes a system. The system also includes one or more memories; and one or more processors, the one or more processors are configured to execute instructions stored in the one or more memories to determine that a contact center request received from a user device is associated with a previous contact center engagement handled by an agent; determine that the contact center request is received within a threshold duration of a termination of the previous contact center engagement; identify the contact center request as a reconnected contact center request in response to determining that the contact center request is received within the threshold duration; determine whether the reconnected contact center request is received within a wrap-up time associated with the previous contact center engagement; and connect the user device to an agent device associated with the agent in response to determining that the reconnected contact center request is received within the wrap-up time. Other embodiments of this aspect include corresponding computer systems, apparatus, and computer programs recorded on one or more computer storage devices, each configured to perform the actions of the methods.

Implementations may include one or more of the following features. The system where the one or more processors are further configured to execute instructions stored in the one or more memories to, in response to determining that the reconnected contact center request is not received within the wrap-up time, place the reconnected contact center request in a queue of the agent or a queue of another agent based on an average engagement time of the agent. The instructions to determine that the contact center request received from the user device is associated with the previous contact center engagement handled by the agent may include instructions to determine that the previous contact center engagement was inadvertently terminated based on an input from the agent indicating that the previous contact center engagement was inadvertently terminated. The instructions to determine that the contact center request received from the user device is associated with the previous contact center engagement handled by the agent may include instructions to identify that the contact center request is associated with the previous contact center engagement based on an input received from the user device. The one or more processors are further configured to execute instructions stored in the one or more memories to connect the user device to the agent device in response to determining that the agent is not in an engagement. The one or more processors can be further configured to execute instructions stored in the one or more memories to extend the wrap-time associated with the previous contact center engagement. The one or more processors can be further configured to execute instructions stored in the one or more memories to output an indication of a difference between a first number of contact center requests marked by the agent as being inadvertently terminated and a second number of contact center requests identified as reconnected contact center requests associated with a subset of the contact center requests. Implementations of the described techniques may include hardware, a method or process, or computer software on a computer-accessible medium.

One general aspect includes a non-transitory computer readable medium storing instructions operable to cause one or more processors to perform operations. The operations can also include determining that a contact center request received from a user device is associated with a previous contact center engagement handled by an agent; determining that the contact center request is received within a threshold duration of a termination of the previous contact center engagement, identifying the contact center request as a reconnected contact center request in response to determining that the contact center request is received within the threshold duration, determining whether the reconnected contact center request is received within a wrap-up time associated with the previous contact center engagement, and connecting the user device to an agent device associated with the agent in response to determining that the reconnected contact center request is received within the wrap-up time. Other embodiments of this aspect include corresponding computer systems, apparatus, and computer programs recorded on one or more computer storage devices, each configured to perform the actions of the methods.

Implementations may include one or more of the following features. The non-transitory computer readable medium where the operations may include, in response to determining that the reconnected contact center request is not received within the wrap-up time, placing the reconnected contact center request in a queue of the agent or a queue of another agent. Determining that the contact center request received from the user device is associated with the previous contact center engagement handled by the agent may include determining that the previous contact center engagement was inadvertently terminated. Determining that the contact center request received from the user device is associated with the previous contact center engagement handled by the agent may include receiving an input indicating that the contact center request is associated with the previous contact center engagement. The operations may include determining whether the agent is available; and connecting the user device to the agent device in in a case that the agent is determined to be available. The operations may include extending a wrap-time associated with the previous contact center engagement. The operations may include identifying a ratio of a first number of contact center requests marked by the agent as being abnormally terminated to a second number of contact center requests identified as reconnected contact center requests associated with a subset of the contact center requests. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    determining that a contact center request received from a user device is associated with a previous contact center engagement handled by an agent;

determining that the contact center request is received within a threshold duration of a termination of the previous contact center engagement;

identifying the contact center request as a reconnected contact center request in response to determining that the contact center request is received within the threshold duration;

determining whether the reconnected contact center request is received within a wrap-up time associated with the previous contact center engagement; and connecting the user device to an agent device associated with the agent in response to determining that the reconnected contact center request is received within the wrap-up time.

2. The method of claim 1, wherein determining that the contact center request received from the user device is associated with the previous contact center engagement handled by the agent comprises:

determining that the previous contact center engagement was inadvertently terminated based on an input from the agent.

3. The method of claim 1, wherein determining that the contact center request received from the user device is associated with the previous contact center engagement handled by the agent comprises:

receiving an input from the user device indicating that the contact center request is associated with the previous contact center engagement.

4. The method of claim 1, further comprising:
determining whether the agent is available; and
connecting the user device to the agent device in response to determining that the agent is available.

5. The method of claim 1, further comprising:
determining that the previous contact center engagement was inadvertently terminated; and
in response to determining that the previous contact center engagement was inadvertently terminated, extending the wrap-up time associated with the previous contact center engagement.

6. The method of claim 1, further comprising:
identifying a difference between a first number of contact center requests marked by the agent as being inadvertently terminated and a second number of contact center requests identified as reconnected contact center requests associated with a subset of the contact center requests.

7. A system, comprising:
one or more memories; and
one or more processors, the one or more processors configured to execute instructions stored in the one or more memories to:
  determine that a contact center request received from a user device is associated with a previous contact center engagement handled by an agent;
  determine that the contact center request is received within a threshold duration of a termination of the previous contact center engagement;
  identify the contact center request as a reconnected contact center request in response to determining that the contact center request is received within the threshold duration;
  determine whether the reconnected contact center request is received within a wrap-up time associated with the previous contact center engagement; and
  connect the user device to an agent device associated with the agent in response to determining that the reconnected contact center request is received within the wrap-up time.

8. The system of claim 7, wherein the one or more processors are further configured to execute instructions stored in the one or more memories to:
in response to determining that the reconnected contact center request is not received within the wrap-up time, place the reconnected contact center request in a queue of the agent or a queue of another agent based on an average engagement time of the agent.

9. The system of claim 7, wherein the instructions to determine that the contact center request received from the user device is associated with the previous contact center engagement handled by the agent comprise instructions to:
determine that the previous contact center engagement was inadvertently terminated based on an input from the agent indicating that the previous contact center engagement was inadvertently terminated.

10. The system of claim 7, wherein the instructions to determine that the contact center request received from the user device is associated with the previous contact center engagement handled by the agent comprise instructions to:
identify that the contact center request is associated with the previous contact center engagement based on an input received from the user device.

11. The system of claim 7, wherein the one or more processors are further configured to execute instructions stored in the one or more memories to:
connect the user device to the agent device in response to determining that the agent is not in an engagement.

12. The system of claim 7, wherein the one or more processors are further configured to execute instructions stored in the one or more memories to:
extend the wrap-up time associated with the previous contact center engagement.

13. The system of claim 7, wherein the one or more processors are further configured to execute instructions stored in the one or more memories to:
output an indication of a difference between a first number of contact center requests marked by the agent as being inadvertently terminated and a second number of contact center requests identified as reconnected contact center requests associated with a subset of the contact center requests.

14. A non-transitory computer readable medium storing instructions operable to cause one or more processors to perform operations comprising:
determining that a contact center request received from a user device is associated with a previous contact center engagement handled by an agent;
determining that the contact center request is received within a threshold duration of a termination of the previous contact center engagement;
identifying the contact center request as a reconnected contact center request in response to determining that the contact center request is received within the threshold duration;
determining whether the reconnected contact center request is received within a wrap-up time associated with the previous contact center engagement; and
connecting the user device to an agent device associated with the agent in response to determining that the reconnected contact center request is received within the wrap-up time.

15. The non-transitory computer readable medium of claim 14, wherein the operations further comprise:
   in response to determining that the reconnected contact center request is not received within the wrap-up time, placing the reconnected contact center request in a queue of the agent or a queue of another agent.

16. The non-transitory computer readable medium of claim 14, wherein determining that the contact center request received from the user device is associated with the previous contact center engagement handled by the agent comprises:
   determining that the previous contact center engagement was inadvertently terminated.

17. The non-transitory computer readable medium of claim 14, wherein determining that the contact center request received from the user device is associated with the previous contact center engagement handled by the agent comprises:
   receiving an input indicating that the contact center request is associated with the previous contact center engagement.

18. The non-transitory computer readable medium of claim 14, wherein the operations further comprise:
   determining whether the agent is available; and
   connecting the user device to the agent device in in a case that the agent is determined to be available.

19. The non-transitory computer readable medium of claim 14, wherein the operations further comprise:
   extending a wrap-time associated with the previous contact center engagement.

20. The non-transitory computer readable medium of claim 14, wherein the operations further comprise:
   identifying a ratio of a first number of contact center requests marked by the agent as being abnormally terminated to a second number of contact center requests identified as reconnected contact center requests associated with a subset of the contact center requests.

* * * * *